(12) United States Patent
Michelsen et al.

(10) Patent No.: US 11,006,636 B2
(45) Date of Patent: May 18, 2021

(54) FOOD DOUGH EXTRUSION MACHINE

(71) Applicant: HAAS FOOD EQUIPMENT GMBH, Leobendorf (AT)

(72) Inventors: Freddy Verner Michelsen, Åstorp (SE); Stefan Jiraschek, Königsbrunn (AT)

(73) Assignee: HAAS FOOD EQUIPMENT GMBH, Leobendorf (AT)

( * ) Notice: Subject to any disclaimer, the term of this patent is extended or adjusted under 35 U.S.C. 154(b) by 81 days.

(21) Appl. No.: 16/333,217

(22) PCT Filed: Sep. 14, 2017

(86) PCT No.: PCT/AT2017/060232
§ 371 (c)(1),
(2) Date: Mar. 13, 2019

(87) PCT Pub. No.: WO2018/049457
PCT Pub. Date: Mar. 22, 2018

(65) Prior Publication Data
US 2019/0216098 A1   Jul. 18, 2019

(30) Foreign Application Priority Data

Sep. 16, 2016  (DE) .................... 10 2016 011 124.0

(51) Int. Cl.
| | |
|---|---|
| *A21C 11/16* | (2006.01) |
| *A21C 3/02* | (2006.01) |
| *A21C 3/04* | (2006.01) |
| *A21C 9/08* | (2006.01) |
| *A21C 1/08* | (2006.01) |

(Continued)

(52) U.S. Cl.
CPC .............. *A21C 11/16* (2013.01); *A21C 3/025* (2013.01); *A21C 3/04* (2013.01); *A21C 9/08* (2013.01);
(Continued)

(58) Field of Classification Search
CPC ........... A21C 1/08; A21C 1/083; A21C 11/16; A21C 5/003; A21C 9/08; A21C 3/02;
(Continued)

(56) References Cited

U.S. PATENT DOCUMENTS

| | | | |
|---|---|---|---|
| 3,782,428 A * | 1/1974 | Cartwright ............... | A21C 9/08 141/115 |
| 4,082,033 A | 4/1978 | Fester | |

(Continued)

FOREIGN PATENT DOCUMENTS

| | | |
|---|---|---|
| CN | 101227824 A | 7/2008 |
| CN | 101862018 A | 10/2010 |

(Continued)

OTHER PUBLICATIONS

International Search Report and Written Opinion of International Application No. PCT/AT2017/060232 dated Jan. 15, 2018.
(Continued)

*Primary Examiner* — Joseph S Del Sole
*Assistant Examiner* — Lawrence D. Hohenbrink, Jr.
(74) *Attorney, Agent, or Firm* — Gordon & Jacobson, P.C.

(57) ABSTRACT

A food dough extrusion machine (10). The machine has a platform (2) and at least one extrusion unit (1) supported by the platform (2). The extrusion machine (10) has a guidance (3) by which the at least one extrusion unit (10) is supported on the platform (2) and by which the at least one extrusion unit (10) is adjustable relative to the platform (2) and/or removable from the platform (2).

31 Claims, 6 Drawing Sheets

(51) Int. Cl.
  *A21D 8/02* (2006.01)
  *A21C 3/10* (2006.01)
  *A21C 5/00* (2006.01)

(52) U.S. Cl.
  CPC ............... *A21C 1/08* (2013.01); *A21C 1/083* (2013.01); *A21C 3/02* (2013.01); *A21C 3/022* (2013.01); *A21C 3/10* (2013.01); *A21C 5/003* (2013.01); *A21D 8/02* (2013.01)

(58) Field of Classification Search
  CPC .. A21C 3/022; A21C 3/04; A21C 3/10; A21C 3/025; A21D 8/02
  USPC .......................................................... 425/288
  See application file for complete search history.

(56) References Cited

U.S. PATENT DOCUMENTS 5,635,235 A    6/1997   Sanchez et al.
5,697,290 A  * 12/1997  Watanabe ................ A21C 3/04
                                                    425/133.1

FOREIGN PATENT DOCUMENTS

| CN | 104839271 A | 8/2015 | |
|---|---|---|---|
| DE | 7118662 U | 11/1971 | |
| DE | 69923586 T2 | 1/2006 | |
| EP | 1602281 A1 * | 12/2005 | ............ A21C 3/022 |
| EP | 1602281 A1 | 12/2005 | |
| EP | 2468104 A1 | 6/2012 | |
| RU | 2375874 C2 | 12/2009 | |
| WO | WO96/23415 A1 | 8/1996 | |
| WO | WO02/24555 A1 | 3/2002 | |
| WO | 2010/040504 A2 | 4/2010 | |

OTHER PUBLICATIONS

Chinese Office Action dated Sep. 10, 2020 of Application No. 201780057136.8.

* cited by examiner

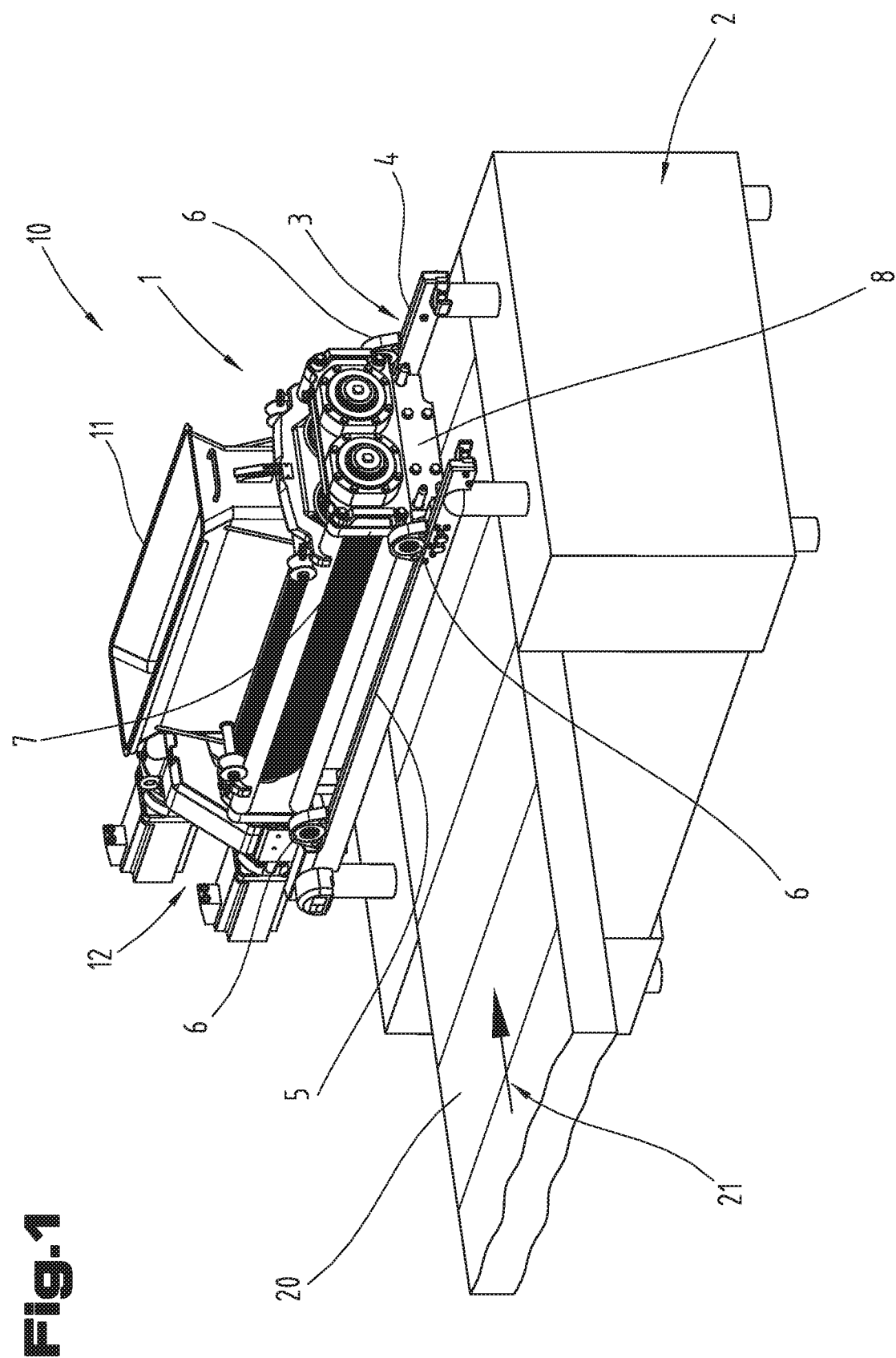

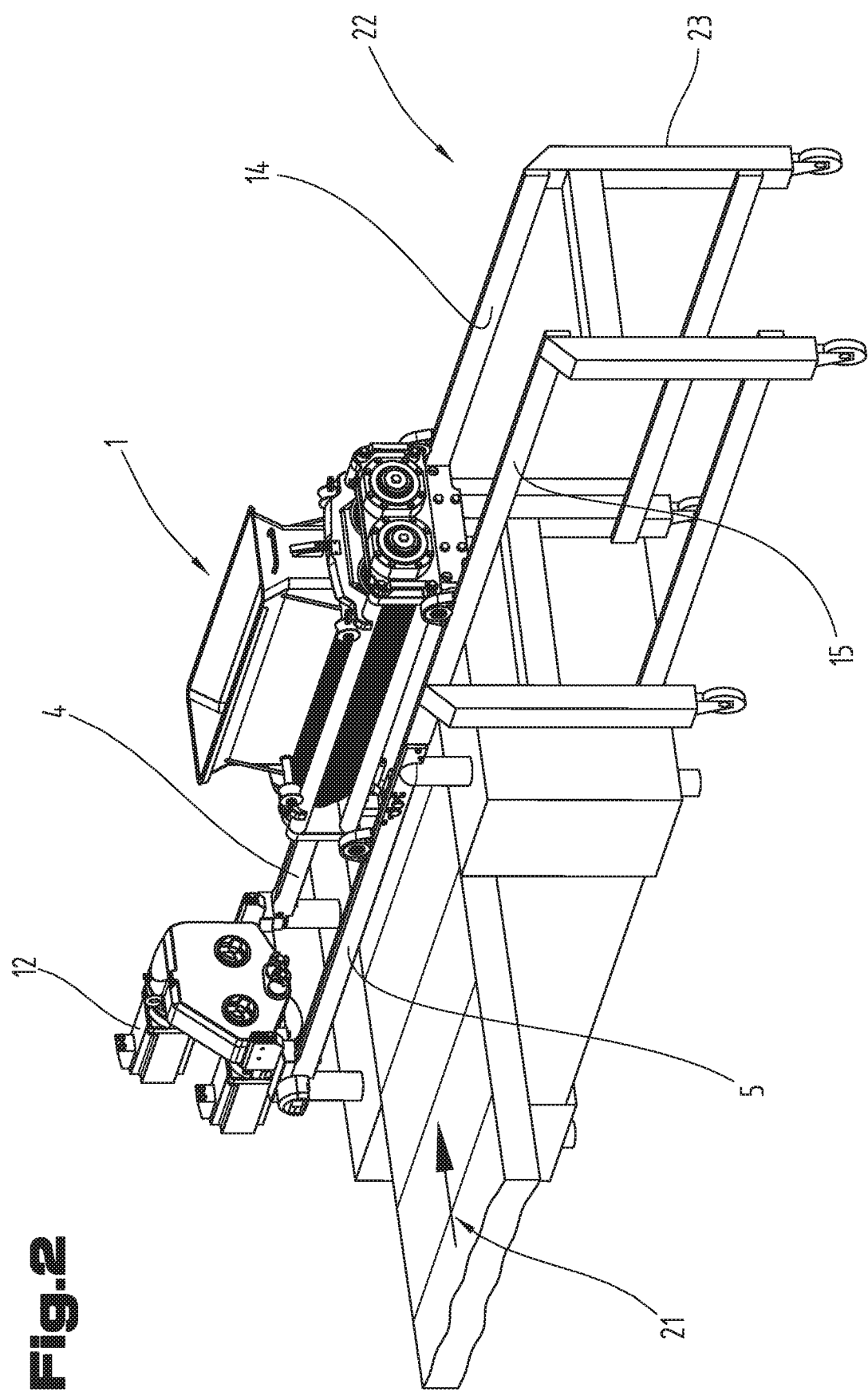

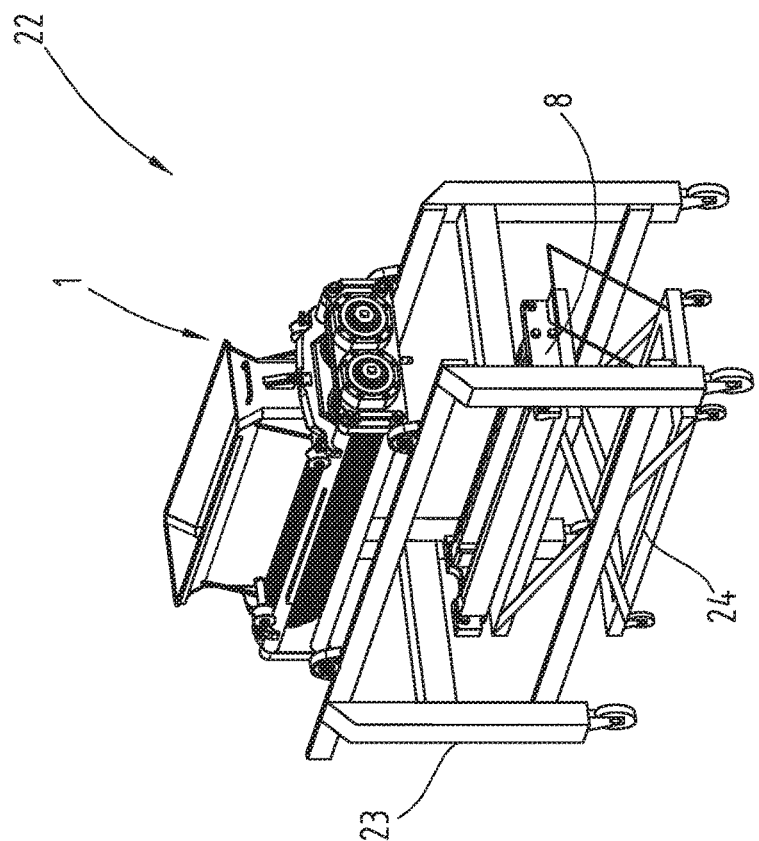
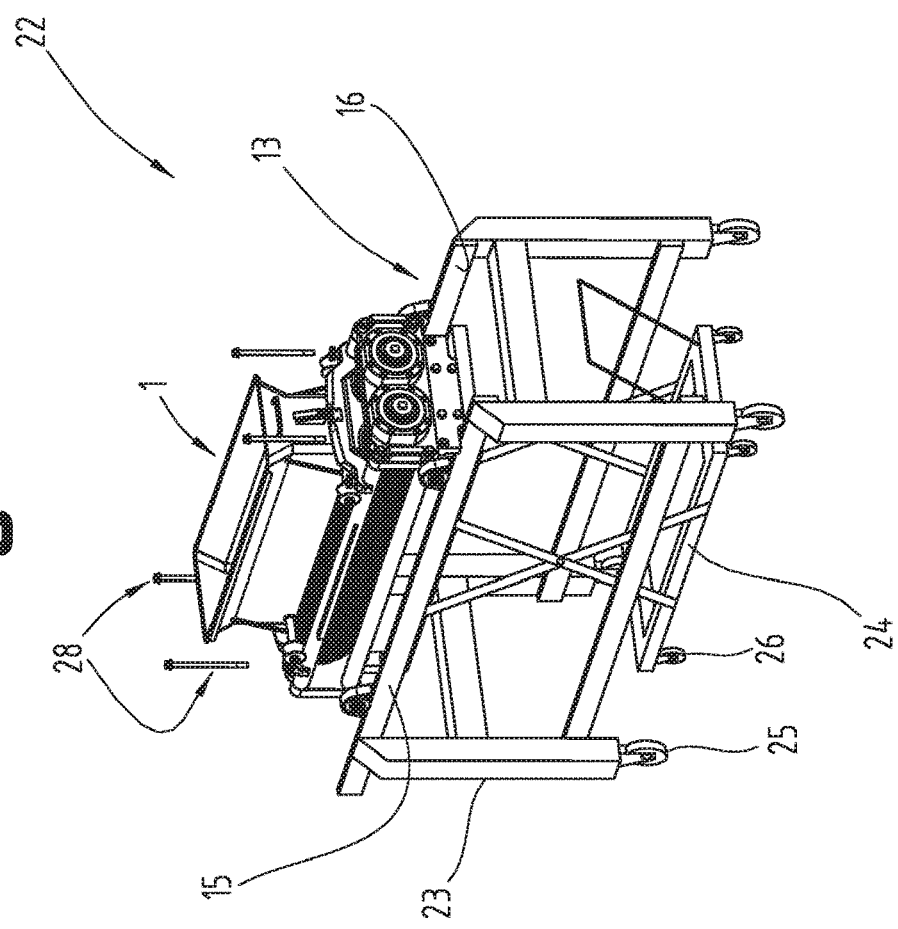

FOOD DOUGH EXTRUSION MACHINE

CROSS-REFERENCE TO RELATED APPLICATION(S)

This application is the National Stage of International Patent Application No. PCT/AT2017/060232 filed on Sep. 14, 2017, which claims priority from German Patent Application No. DE 102016011124.0 filed on Sep. 16, 2016, both of which are hereby incorporated by reference herein in their entireties.

BACKGROUND

1. Field of the Invention

The invention relates to a food dough extrusion machine comprising a platform and at least one extrusion unit supported by the platform. The invention also relates to a method for changing the functionality of a dough extrusion machine.

2. State of the Art

DE69923586T2 discloses a moulding device for moulding three-dimensional products from a mass of foodstuff. The moulding device comprises a mould having a mould cavity with a filling opening for filling the cavity with a portion of the mass. A closure means closes the filling opening of the mould cavity, so that the mass is held in the closed mould cavity for a fixing period after which the mould cavity is opened and the moulded product is removed. The moulding device may be a drum rotatable around a horizontal axis and comprising along its circumference a plurality of moulds.

DE7118662U discloses a device for depositing dough on a carrier. The pressing action for pressing dough through outlet openings has to be provided by an operator by means of a lever system.

Extrusion machines according to prior art are inflexible. The change of functionality, particularly the adaption to different food qualities is usually not possible or very difficult. Usually different extrusion machines are necessary in order to process different dough qualities.

SUMMARY

Accordingly, it is an object of the invention to provide an improved dough extrusion machine for food industry. In particular, the dough extrusion machine shall allow for high flexibility or adjustability as well as for easily changing the functionality. Handling, exchange and cleaning of parts coming into contact with dough should be simplified. Furthermore, assembling and servicing shall be performed at lower costs and in shorter time.

The problem of the invention is solved by a dough extrusion machine as defined in the opening paragraph, in that the extrusion machine has a guidance by which the at least one extrusion unit is supported on the platform and by which the at least one extrusion unit is adjustable relative to the platform and/or removable from the platform.

The invention facilitates adjustment, (re)moving and/or exchange of the extrusion unit. The guidance not only allows correct adjustment of the extrusion unit prior or during operation, but also allows to completely remove the extrusion unit by means of the guidance.

The invention relates to a food dough extrusion machine, particularly for producing bakery products, such as biscuits, cookies, crackers, etc. The term "dough" has a broad meaning within the sense of the present application and comprises any flowable food masses or kneaded food material, including fillings, creams, paste-like material, and may contain cereals (particularly wheat), sugar, salt, milk, eggs, bakery improvers, chocolate, nougat, nuts and/or other ingredients.

The platform may be any kind of support supporting the extrusion units, particularly a table, a frame, a base, etc., preferably with an integrated conveyor for transporting extruded dough.

The extrusion unit has a plurality of outlet nozzles through which the dough flow (extruded dough) is discharged, e.g. onto a conveyor.

In a preferred embodiment the extrusion unit is supported on the platform by means of rolls which are rollable along the guidance. This reduces friction during movement. Preferably, the rolls are mounted to the upper part of the extrusion unit.

Preferably, each roll is covered by a protective cover moving along with the respective roll. In such a way the rolls are protected from dough, dirt and external impacts.

In a preferred embodiment the guidance is provided on the platform and the rolls are mounted to the extrusion unit. Here, the guidance is stationary with respect to the platform.

In a preferred embodiment the guidance comprises at least two parallel rails, allowing a stable and well-defined support of the extrusion unit.

In a preferred embodiment the extrusion unit has a lower part and an upper part, wherein the lower part is detachable from the upper part, wherein the distance between the rails is larger than the width of the lower part. Width is the extension of the extrusion unit in a direction perpendicular to the rails. Here, the lower part may be lowered through the area between the rails or rails of a corresponding carrier (see below).

In a preferred embodiment the lower part comprises a functional insert for conducting dough, preferably a pump and/or a filler block and/or a nozzle arrangement. By exchanging only the lower part or only the functional insert (the upper part stay the same) the functionality of the extrusion machine may be changed in an quick and elegant way. In the case of a pump the functional insert may comprise structured rolls pumping the dough towards the outlet nozzles. A filler block is a passive element forming at least one, preferably a plurality channels for conducting dough from the feed rollers of the extrusion unit to the outlet nozzles.

Preferably, the extrusion unit comprises at least one feed roller, preferably (at least two) feed rollers, wherein preferably the at least one feed roller is accommodated in the upper part of the extrusion unit. The feed roller(s) is/are rotatably mounted within the extrusion unit and connected to a drive. The feed roller(s) force(s) dough from the dough supplying means (hopper) towards the outlet (nozzles).

The upper part of the extrusion unit may further comprise a hopper or any other suitable dough supplying means. It is preferred that the upper part of the extrusion unit comprises two feeding rollers forming a gap for transferring the dough towards the outlet nozzles. Downstream of the feeding rollers and upstream of the outlet nozzles the lower part comprises a functional unit such as a pump housing (e.g. comprising structured rolls) or a filler block.

Preferably, the extrusion unit has a guidance by which the dough supplying means is moveably supported, preferably by means of rolls which are rollable along the guidance, wherein preferably the guidance supporting the dough supplying means is essentially parallel to the guidance supporting the extrusion unit. This allows adjustment of the dough supplying means (hopper) prior or during operation.

In a preferred embodiment the lower part comprises a frame to which the functional insert is detachably mounted. Here, only the insert may be exchanged.

Preferably, the lower part is detachable from the upper part in a downward direction. This allows an ease removal of the lower part, particularly on an external carrier system. Particularly, the lower part may be lowered through an area between the rails of the guidance.

Preferably, the lower part is attached to the upper part by fastening means, preferably by screws, wherein the fastening means is accessible from the top or the side of the extrusion unit and/or comprises a quick release mechanism. This allows for good accessibility and simple removal of the lower part.

In a preferred embodiment the extrusion unit is detachably coupled to a drive unit for driving a functional insert in the lower part of the extrusion unit and/or feed rollers accommodated in the upper part of the extrusion unit. By moving the extrusion unit along the guidance it may be removed from the driving unit. The driving unit may be stationary with respect to the guidance. This embodiment is preferred since the extrusion unit may be easily removed from the platform without the driving unit. The driving unit may comprise a drive for feed rollers accommodated in the upper part of the extrusion unit and a drive for the functional unit in the lower part of the extrusion unit, such as a pump.

In a preferred embodiment the platform comprises a conveyor (e.g. belt) for transporting dough extruded by the extrusion unit, wherein the guidance extends above the conveyor, preferably transverse, more preferred essentially perpendicular to the transporting direction of the conveyor. Here, the guidance forms a bridge over the conveyor. It is preferred that the extrusion unit has longitudinal extension and extends transverse to the transporting direction of the conveyor. The outlet nozzles of the extrusion unit are arranged along the longitudinal direction of the extrusion unit.

In a preferred embodiment the dough extrusion machine comprises a carrier system for temporarily supporting an extrusion unit, wherein the carrier system comprises a first carrier having a guidance, preferably in form of two parallel rails, wherein the guidance may be brought into alignment with the guidance formed on the platform, such that the extrusion unit may be moved along the guidances from the platform to the first carrier and vice versa. By aligning the guidance of the platform and the guidance of the first carrier the extrusion unit may easily transferred from the platform to the carrier system. On the carrier system the functionality of the extrusion unit may be changed, e.g. by exchanging the lower part of the extrusion unit.

In a preferred embodiment the carrier system comprises a second carrier that may be lowered with respect to the first carrier. The second carrier may be arranged below or within the first carrier for supporting and lowering the lower part of the extrusion unit, while the upper part is held by the first carrier.

In a preferred embodiment the first carrier and/or the second carrier has/have rolls by which the first carrier and/or the second carrier are movable relative to the platform. This allows cleaning, servicing and/or changing functionality of the extrusion unit apart from the platform.

The problem is also solved by a method for changing the functionality of a dough extrusion machine, comprising the steps of: (a) removing the extrusion unit from the platform and (b) exchanging a functional insert of the extrusion unit and (c) moving the extrusion unit to the platform (again).

In a preferred embodiment during step (a) the extrusion unit is moved along the guidances from the platform to the first carrier of the carrier system and wherein step (b) is performed on the carrier system.

In a preferred embodiment the extrusion unit has a lower part and an upper part, wherein the lower part is detachable from the upper part, and wherein the carrier system comprises a second carrier that may be lowered with respect to the first carrier, and wherein the lower part of the carrier is lowered by the second carrier.

In a preferred embodiment the first carrier has two rails and wherein the lower part of the extrusion unit is lowered through the area between the rails of the first carrier.

BRIEF DESCRIPTION OF THE DRAWINGS

For a better understanding of the invention the latter is explained in more detail with reference to the following Figures.

FIG. 1 shows a dough extrusion machine according to the invention,

FIG. 2 shows the dough extrusion machine with a carrier system,

FIG. 3 shows the carrier system comprising a first carrier and a second carrier, FIG. 4 shows the carrier system with lowered second carrier.

DETAILED DESCRIPTION

Figure 5:
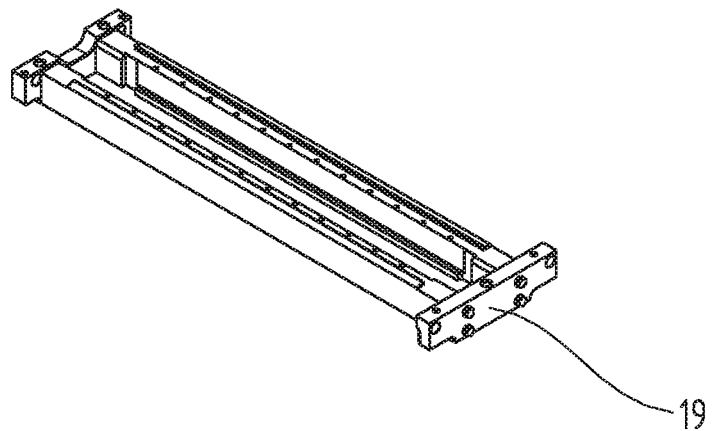
FIG. 5 shows the frame of the lower part of the extrusion unit.

Generally, the same parts or similar parts are denoted with the same/similar names and reference signs. The features disclosed in the description apply to parts with the same/similar names respectively reference signs. Indicating the orientation and relative position (up, down, sideward, etc.) is related to the associated Figure, and indication of the orientation and/or relative position has to be amended in different Figures accordingly as the case may be.

FIG. 1 shows a food dough extrusion machine 10 comprising a platform 2 and an extrusion unit 1 supported by the platform 2. The extrusion machine 10 has a guidance 3 by which the at least one extrusion unit 10 is supported on the platform 2 and by which the at least one extrusion unit 10 is adjustable relative to the platform 2 and/or removable from the platform 2 (FIG. 2).

The extrusion unit 1 is supported on the platform 2 by means of rolls 6 which are rollable along the guidance 3 which comprises at least two parallel rails 4, 5. Each roll 6 may be covered by a protective cover moving along with the respective roll 6 (FIG. 1).

The platform 2 also comprises a conveyor 20 (in form of a transporting belt) for transporting dough extruded by the extrusion unit 1, wherein the guidance 3 extends above the conveyor 20, preferably transverse, more preferred essentially perpendicular to the transporting direction 21 of the conveyor 20.

Figure 8:
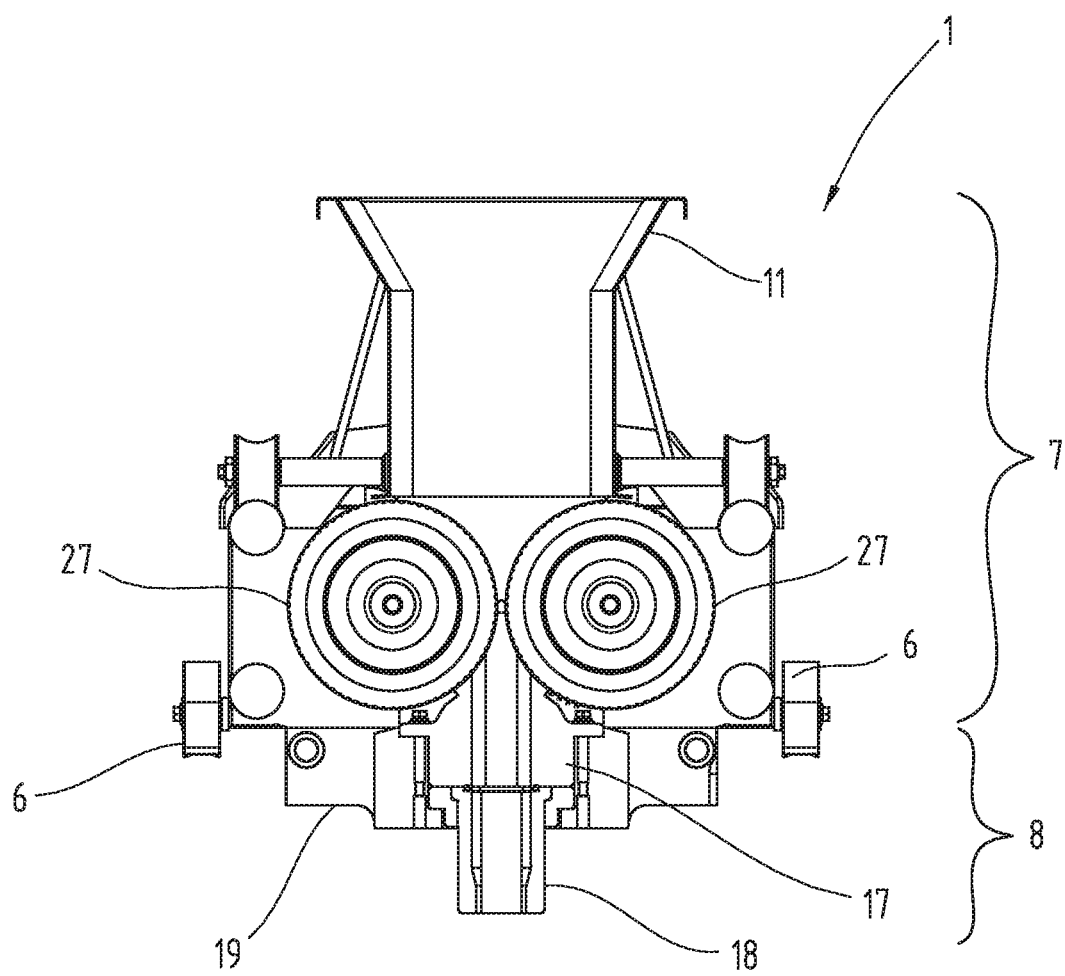
FIG. 8 shows in a cross sectional view the extrusion unit having a filler block.
Figure 9:
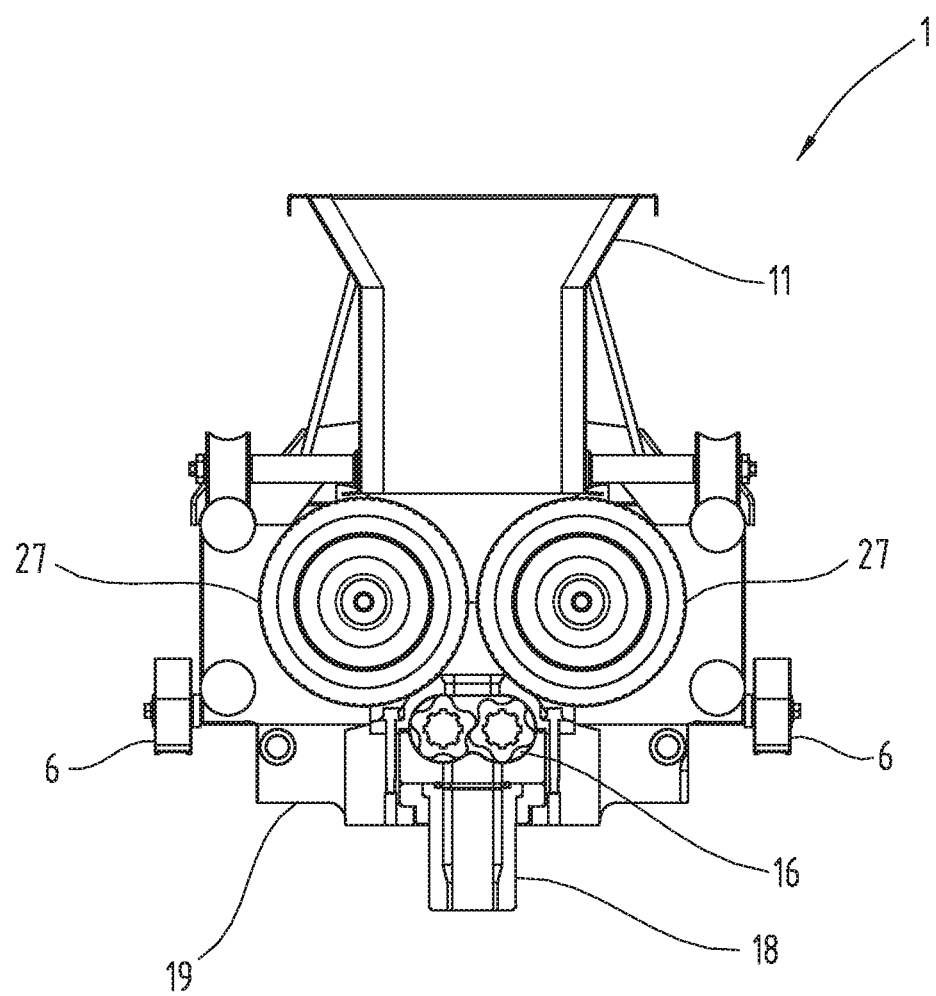
FIG. 9 shows in a cross sectional view the extrusion unit having a pump.

The extrusion unit 1 has a lower part 8 for accommodating a functional insert 9 (FIGS. 6 and 7) and an upper part 7 accommodating feed rollers 27 (FIGS. 8 and 9) for feeding dough from the hopper 11 to the functional insert 9. The functional insert 9 conducts dough towards outlet nozzles 18. The functional insert 9 may be a pump 16 e.g. in form of a pump housing (FIG. 9) or a filler block 17 (FIG. 8) and may also comprise the outlet nozzle arrangement 18. While the pump actively forces dough towards the outlet nozzles 18, the filler block 17 is a passive element e.g. comprising a plurality of channels leading towards the outlet nozzles 18. It depends on dough quality (weight, density, flow characteristic) which functional insert is best used. The extrusion unit of FIG. 8 has thus a different functionality than the extrusion unit of FIG. 9.

As can be seen from FIG. 1 the extrusion unit 1 has a guidance by which the hopper 11 is moveably supported by means of rolls which are rollable along the guidance. The guidance supporting the hopper 11 is essentially parallel to the guidance 3 supporting the extrusion unit 1.

As can be seen from FIG. 2 the extrusion unit 1 is detachably coupled to a drive unit 12 for driving a functional insert 9 in the lower part 8 of the extrusion unit 1 and the feed rollers 27 accommodated in the upper part 7 of the extrusion unit 1. Here, the drive unit 12 is mounted to the guidance 3.

FIG. 2 shows a carrier system 22 for temporarily supporting an extrusion unit 1, wherein the carrier system 22 comprises a first carrier 23 having a guidance 13 in form of two parallel rails 14, 15, wherein the guidance 13 may be brought into alignment with the guidance 3 formed on the platform 2. In this alignment the extrusion unit 1 may be moved along the guidances 3, 13 from the platform 2 to the first carrier 23 and vice versa.

FIGS. 3 and 4 show that the carrier system 22 comprises also a second carrier 24 that may be lowered with respect to the first carrier 23. With the second carrier 24 the lower part 8 of the extrusion unit 1 may be lowered and removed/exchanged (FIG. 4). The second carrier 24 has a scissor-type lowering mechanism. The lower part 8 of the extrusion unit 1 is detachable from the upper part 7 (by removing screws 28 in FIG. 3), wherein the distance between the rails 4, 5 and 14, 15 is larger than the width of the lower part 8, such that the lower part 8 may be lowered through the area between the rails 14, 15.

The first carrier 23 and the second carrier 24 have rolls 25, 26 by which they are movable relative to the platform 2.

Figure 6:
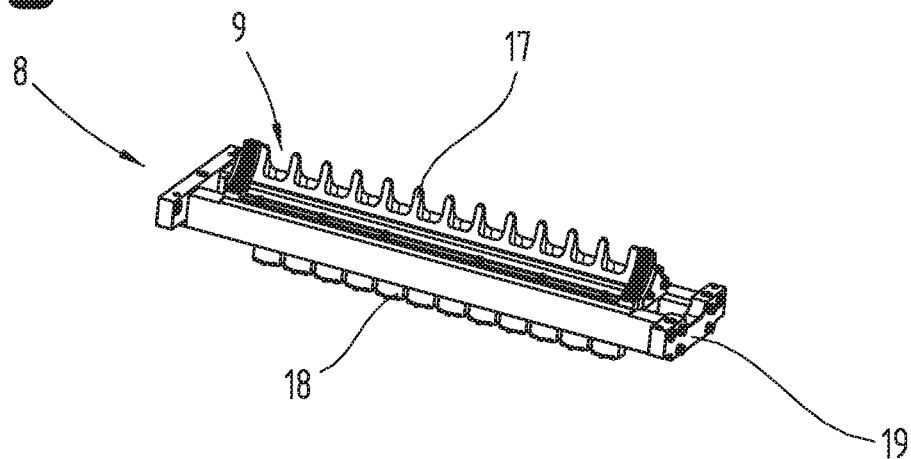
FIG. 6 shows the frame with a filler block.
Figure 7:
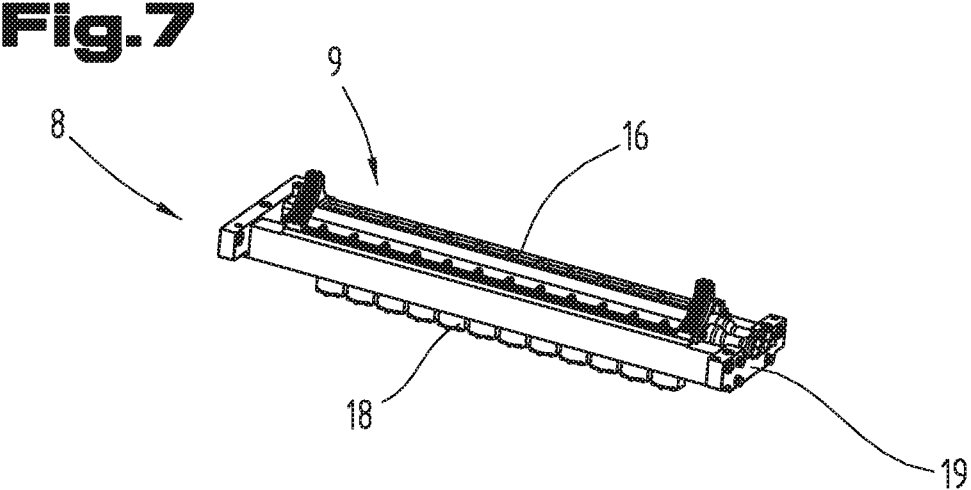
FIG. 7 shows the frame with a pump housing.

The lower part 8 comprises a frame 19 to which the functional insert 9 is detachably mounted (FIGS. 5, 6 and 7). In FIG. 6 a filler block 17 with a nozzle arrangement 18 is inserted in the frame 19. In FIG. 7 a pump 16 (housing) with a nozzle arrangement 18 is inserted in the frame 19. In order to change the functionality of the extrusion unit 1, the lower part 8 is removed and exchanged as a whole or only the functional insert 9 is exchanged and the same frame 19 is used again.

As can be seen from FIGS. 3 and 4 the lower part 8 is detachable from the upper part 7 in a downward direction.

The method for changing the functionality of a dough extrusion machine 10 comprises the steps of: (a) removing the extrusion unit 1 from the platform 2 (see FIG. 2) and (b) exchanging a functional insert 9 of the extrusion unit 1 (FIGS. 3 and 4) and (c) moving the extrusion unit 1 with the exchanged functional insert 9 to the platform 2.

Removing or exchanging the functional insert 9 is done by means of the carrier system 22. The first carrier 23 supports the upper part 7 of the extrusion unit 1, while the second carrier 24 supports the lower part 8 and is lowered with respect to the first carrier 23. The second carrier 24 may be—independently of the first carrier 23—moved to a different place and a new/different lower part or only a new/different functional insert may be arranged to the second carrier 24 in order to be joined with the upper part (waiting on the first carrier 23) again.

In the step shown in FIGS. 3 and 4 the lower part 8 of the extrusion unit 1 is lowered through the area between the rails 14, 15.

It is noted that the invention is not limited to the embodiments disclosed hereinbefore, but combinations of the different variants are possible. In reality, the dough extrusion machine may have more or less parts than shown in the Figures. The machine and parts thereof may also be shown in different scales and may be bigger or smaller than depicted. Finally, the description may comprise subject matter of further independent inventions.

LIST OF REFERENCE SIGNS 1 extrusion unit
2 platform
3 guidance
4 rail
5 rail
6 rolls
7 upper part
8 lower part
9 functional insert
10 frame
11 hopper
12 drive unit
13 guidance
14 rail
15 rail
16 pump
17 filler block
18 nozzle arrangement
19 frame
20 conveyor
21 transporting direction
22 carrier system
23 first carrier
24 second carrier
25 rolls
26 rolls
27 feed roller
28 screw

The invention claimed is:
1. Food dough extrusion machine comprising:
a platform;
at least one extrusion unit supported by the platform, characterized in that the platform has a guidance by which the at least one extrusion unit is supported on the platform and by which the at least one extrusion unit is adjustable relative to the platform and/or removable from the platform; and
a carrier system for temporarily supporting the extrusion unit, wherein the carrier system comprises a first carrier having an additional guidance in the form of two parallel rails, wherein the additional guidance may be brought into alignment with the guidance of the platform such that the extrusion unit may be moved between the platform and the first carrier.

2. Food dough extrusion machine according to claim 1, wherein the extrusion unit is supported on the platform by means of rolls which are rollable along the guidance of the platform.

3. Food dough extrusion machine according to claim 2, wherein the guidance is provided on the platform and the rolls are mounted to the extrusion unit.

4. Food dough extrusion machine according to claim 2, wherein each roll is covered by a protective cover moving along with the respective roll.

5. Food dough extrusion machine according to claim 3, wherein the guidance comprises at least two parallel rails.

6. Food dough extrusion machine according to claim 1, wherein the extrusion unit has a lower part and an upper part, wherein the lower part is detachable from the upper part.

7. Food dough extrusion machine according to claim 6, wherein the distance between the two parallel rails of the guidance is larger than the width of the lower part.

8. Food dough extrusion machine according to claim 6, wherein the lower part comprises a functional insert for conducting dough.

9. Food dough extrusion machine according to claim 8, wherein the lower part comprises a frame to which the functional insert is detachably mounted.

10. Food dough extrusion machine according to claim 8, wherein the functional insert comprises at least one of a pump or a filler block or a nozzle arrangement.

11. Food dough extrusion machine according to claim 6, wherein the lower part is detachable from the upper part in a downward direction.

12. Food dough extrusion machine according to claim 6, wherein the lower part is attached to the upper part by fastening means, wherein the fastening means is accessible from the top or the side of the extrusion unit and/or comprises a quick release mechanism.

13. Food dough extrusion machine according to claim 12, wherein the lower part is attached to the upper part by the quick release mechanism and/or by screws that are accessible from the top or the side of the extrusion unit.

14. Food dough extrusion machine according to claim 6, wherein the upper part has rolls which are rollable along the guidance.

15. Food dough extrusion machine according to claim 6, wherein the extrusion unit is detachably coupled to a drive unit for driving a functional insert in the lower part of the extrusion unit and/or feed rollers accommodated in the upper part of the extrusion unit.

16. Food dough extrusion machine according to claim 6, wherein the platform comprises a conveyor for transporting dough extruded by the extrusion unit, wherein the guidance extends above the conveyor.

17. Food dough extrusion machine according to claim 16, wherein the extrusion unit has a plurality of outlet nozzles through which the dough flow is dischargeable, onto a conveyor.

18. Food dough extrusion machine according to claim 6, wherein the extrusion unit comprises at least one feed roller, accommodated in the upper part of the extrusion unit.

19. Food dough extrusion machine according to claim 6, wherein the extrusion unit or the upper part of the extrusion unit, comprises a dough supplying hopper.

20. Food dough extrusion machine according to claim 19, wherein the extrusion unit has a guidance by which the dough supplying hopper is moveably supported.

21. Food dough extrusion machine according to claim 19, wherein the extrusion unit has a guidance by which the dough supplying hopper is movably supported by means of rolls which are rollable along the guidance, wherein the guidance supporting the dough supplying hopper is essentially parallel to the guidance supporting the extrusion unit.

22. Food dough extrusion machine according to claim 6, wherein the extrusion unit is detachably coupled to a drive unit for driving a functional insert in the lower part of the extrusion unit and/or feed rollers accommodated in the upper part of the extrusion unit, wherein the drive unit is mounted to the guidance or wherein the drive unit is stationary with respect to the guidance.

23. Food dough extrusion machine according to claim 6, wherein the platform comprises a conveyor for transporting dough extruded by the extrusion unit, wherein the guidance extends above the conveyor essentially perpendicular to the transporting direction of the conveyor.

24. Food dough extrusion machine according to claim 1, wherein the extrusion unit moves along the guidance and additional guidance from the platform to the first carrier and vice versa.

25. Food dough extrusion machine according to claim 1, wherein the carrier system further comprises a second carrier that may be lowered with respect to the first carrier.

26. Food dough extrusion machine according to claim 25, wherein at least one of the first carrier and the second carrier has rolls by which the first carrier or the second carrier are movable relative to the platform.

27. Food dough extrusion machine according to claim 1, wherein the carrier system further comprises a second carrier that may be lowered with respect to the first carrier, wherein the second carrier has a scissor-type lowering mechanism.

28. A method for changing the functionality of a dough extrusion machine comprising:
(a) providing a dough extrusion machine according to claim 8;
(b) removing the extrusion unit from the platform;
(c) exchanging a functional insert of the extrusion unit; and
(d) moving the extrusion unit to the platform.

29. A method for changing the functionality of a dough extrusion machine comprising:
(a) providing a dough extrusion machine according to claim 26;
(b) removing the extrusion unit from the platform;
(c) exchanging a functional insert of the extrusion unit; and
(d) moving the extrusion unit to the platform;
wherein during (a) the extrusion unit is moved along the guidance and additional guidance from the platform to the first carrier of the carrier system and wherein is performed on the carrier system.

30. A method according to claim 28, wherein the extrusion unit has a lower part and an upper part, wherein the lower part is detachable from the upper part, and wherein the carrier system comprises a second carrier that may be lowered with respect to the first carrier, and wherein the lower part is lowered by the second carrier.

31. A method according to claim 28, wherein the lower part of the extrusion unit is lowered through the area between the two parallel rails of the first carrier.

* * * * *